April 14, 1925.

O. LINSTADT

FLOAT VALVE

Filed Nov. 28, 1923

1,533,434

Inventor
Otto Linstadt
by
Lester L. Sargent.
Attorney

Patented Apr. 14, 1925.

1,533,434

UNITED STATES PATENT OFFICE.

OTTO LINSTADT, OF MADISON, NEBRASKA.

FLOAT VALVE.

Application filed November 28, 1923. Serial No. 677,431.

*To all whom it may concern:*

Be it known that I, OTTO LINSTADT, a citizen of the United States, residing at Madison, in the county of Madison and State of Nebraska, have invented a new and useful Float Valve, of which the following is a specification.

The object of my invention is to provide a float operated valve for use in maintaining a constant level of water in tanks, the valve being arranged to seat upwardly; and to provide novel means for adjusting the device; and to provide the novel combination and arrangement of parts disclosed in the drawings, in which—

Like numerals indicate like parts in each of the views.

Figure 2:
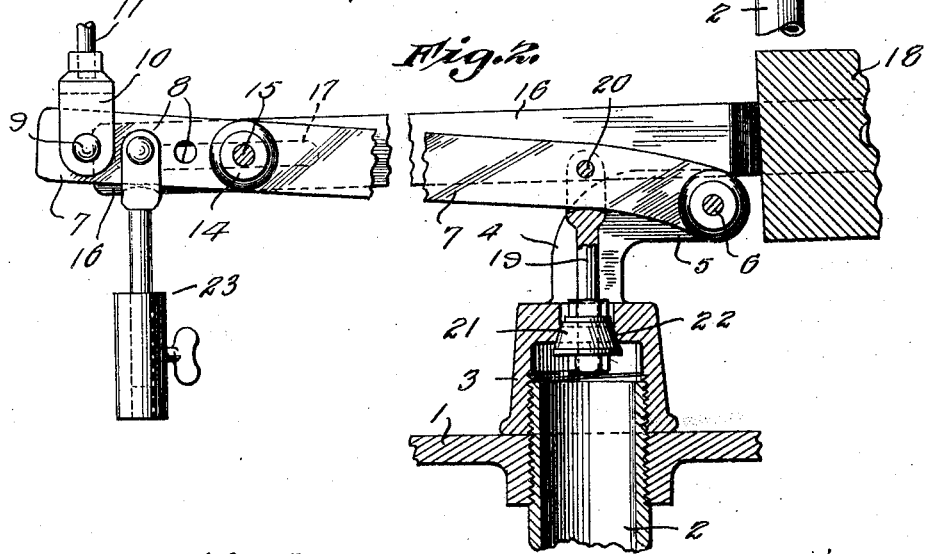
Fig. 2 is a view partly in section and partly in elevation, showing the valve seat and valve in detail.
Figure 3:
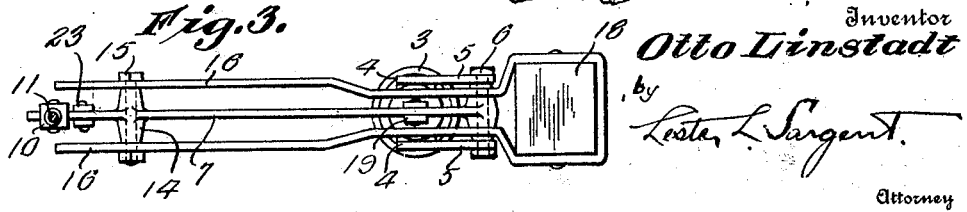
Fig. 3 is a section on line 3—3 of Fig. 1.

Referring to the accompanying drawing, I provide a tank 1 having a suitable inlet pipe 2 threaded at its end and to which the valve casing 3 is secured, as shown in Fig. 2. The valve casing 3 is provided with a tapered valve seat and port 22, on which seat the frusto-conical valve 21 seats. Valve 21 is secured to a valve stem 19 which is pivoted at 20 to the valve operating arm 7. Arm 7 is pivoted by a bolt 6 to the horizontal portion 5 of an inverted L-shaped supporting arm 4 which is affixed to or integral with valve casing 3. At the other end of arm 7 are provided a plurality of spaced apertures 8 of suitable size to receive a rivet or bolt 9 to which the bifurcated ends 10 of float rod 11 is pivotally attached. Float rod 11 is provided with suitable adjusting collars 13 which adjustably secure the float 12 to rod 11. I provide a suitable balancing weight 18 attached to one end of weight arm 16, the other end of which is provided with a longitudinally extending slot 17 to receive the bolt 15, which is mounted in the bosses 14 which space the two sections of arm 16 apart from each other and from arm 7, as shown in Fig. 2.

Figure 1:
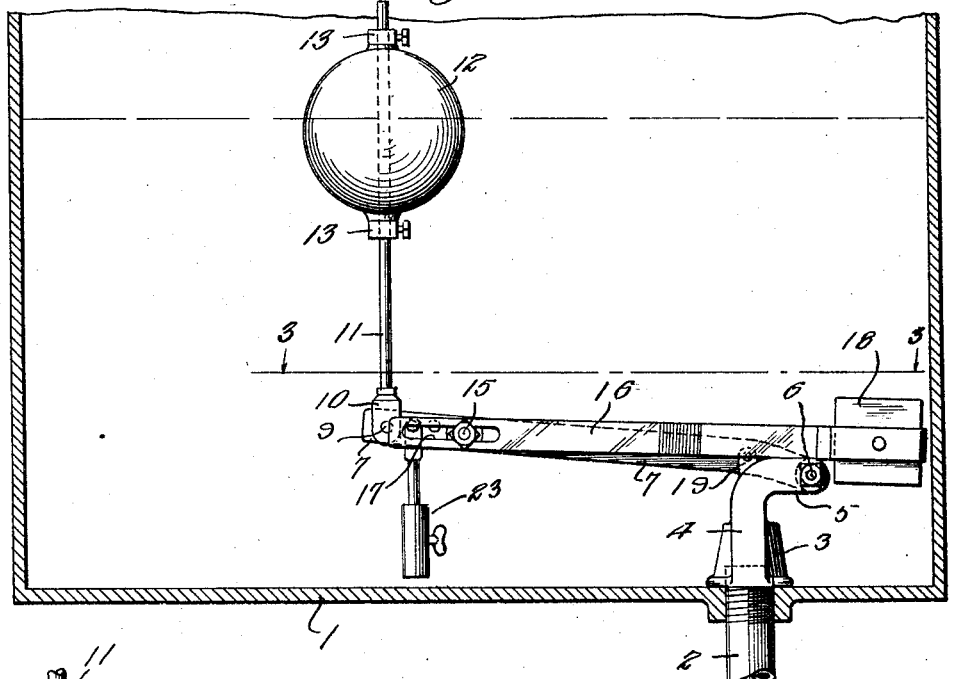
Figure 1 is a side elevation of my invention mounted in a tank.

In operation the valve 21 unseats downwardly to allow water to pass through port 22 into tank 1; and when the tank fills with water it raises float 12, causing valve 21 which is controlled by weight arm 16 and balancing weight 18 to seat and close the port and prevent more water from flowing into the tank until its level is again lowered. Float 12 being adjustably positioned on rod 11 by adjusting collars 13 may be shifted to any desired adjusted position on this rod. Weight arm 16 also may be adjusted by loosening bolt 15 and shifting the balancing weight toward or farther from pivot 6, as will be readily understood by referring to Fig. 1. By having the valve seat upwardly an important advantage is obtained in that the pressure of water in flowing through inlet 2 comes against the valve, tending to cause it to seat more snugly on valve seat 22 and thus increase the efficiency of the valve. The seat 22 is of brass and the valve 21 is provided wtih a rubber gasket so that the valve will fit snugly on its seat and operate efficiently. I provide an adjustable stop member 23 depending from arm 7 and functioning to limit the downward swinging movement of that member.

What I claim is:

1. In a valve of the class described, the combination of an inlet pipe, a valve casing attached to said pipe, the valve casing having a port therethrough, a valve seating upwardly to close said port, a pivotally supported arm to which the valve is operatively connected, a float element adjustably attached to the free end of the pivotally mounted arm, and a weighted twin arm adjustably attached to the pivotally mounted arm.

2. In combination with the apparatus described in claim 1, an adjustably suspended stop member for limiting the downward movement of the valve operating arm.

3. In combination with a water tank having an inlet pipe, a valve casing threaded on the inlet pipe, said valve casing having an upwardly tapering valve seat and port, an upwardly tapering valve adapted to seat in and close said port, an inverted L-shaped arm formed on the valve casing, a valve-operating arm pivotally attached to said supporting arm, a rod pivotally attached to said arm and secured to the valve, a balancing weight adjustably secured to the valve operating arm, and a float element adjustably secured to the valve operating arm at the end distant from the balancing weight, for automatic control of the valve.

OTTO LINSTADT.